United States Patent

[11] 3,618,797

[72] Inventor Robert A. Pratt
 Harbert, Mich.
[21] Appl. No. 862,233
[22] Filed Sept. 30, 1969
[45] Patented Nov. 9, 1971
[73] Assignee Clark Equipment Company

[54] LOAD TRANSFER DEVICE AND METHOD
 7 Claims, 11 Drawing Figs.
[52] U.S. Cl. ................................................. 214/38 BA,
 214/38 D, 214/152, 280/35
[51] Int. Cl. ................................................. B65g 67/02
[50] Field of Search ........................................ 214/38 R,
 38 A, 38 B, 38 BA, 38 BB, 38 C, 38 D, 152; 280/35

[56] References Cited
 UNITED STATES PATENTS
2,543,295 2/1951 McGregor et al. ............ 214/38 A
3,002,636 10/1961 Felburn ........................ 214/38 A
3,206,053 9/1965 Bridge ......................... 214/38 D Primary Examiner—Robert G. Sheridan
Attorneys—Hobbs & Green and Kemon, Palmer & Estabrook ABSTRACT: A device for transferring a load container to a dock from a truck employs a telescoping rear truck trailer chassis portion movable relative to a front portion with support of the load container on the supporting surfaces of said chassis portions arranged for relative sliding movement with the under surface of the container on forward and reverse movement of the truck thereby to slide the container onto the dock.

A method of transferring a load container from a truck to a dock by a series of relative sliding movements between the container and portions of the truck; first projecting the rear portion of the container onto the dock by reverse drive while a rear portion of the truck telescopes under the container; subsequently sliding the truck trailer rear and front portions forward under the container by forward drive of the truck; and pushing the container further into storage position on the dock with reverse drive again. A modified form leaves the container with its rear end on the edge of the dock and the front portion resting on a removable support.

PATENTED NOV 9 1971

INVENTOR
ROBERT A. PRATT
BY Hobbs & Green

ATTORNEYS

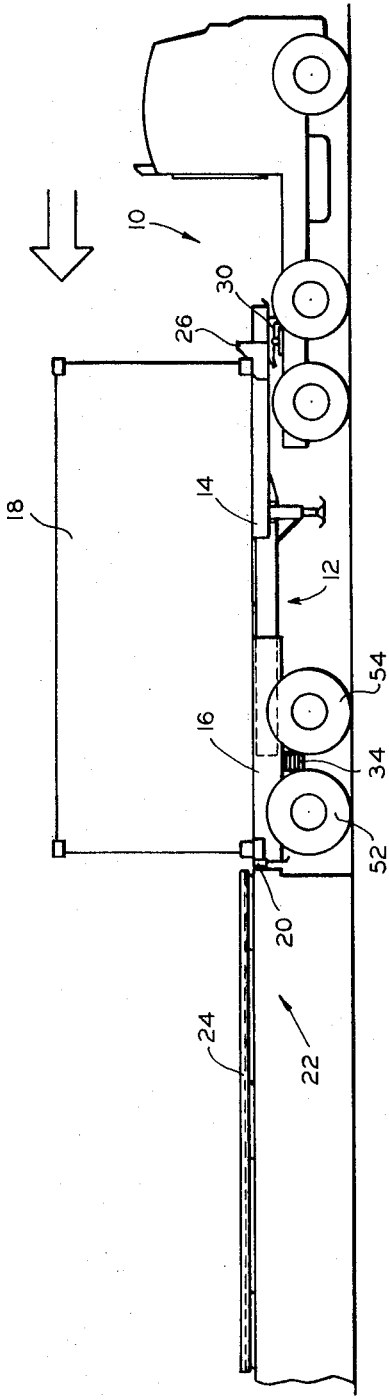
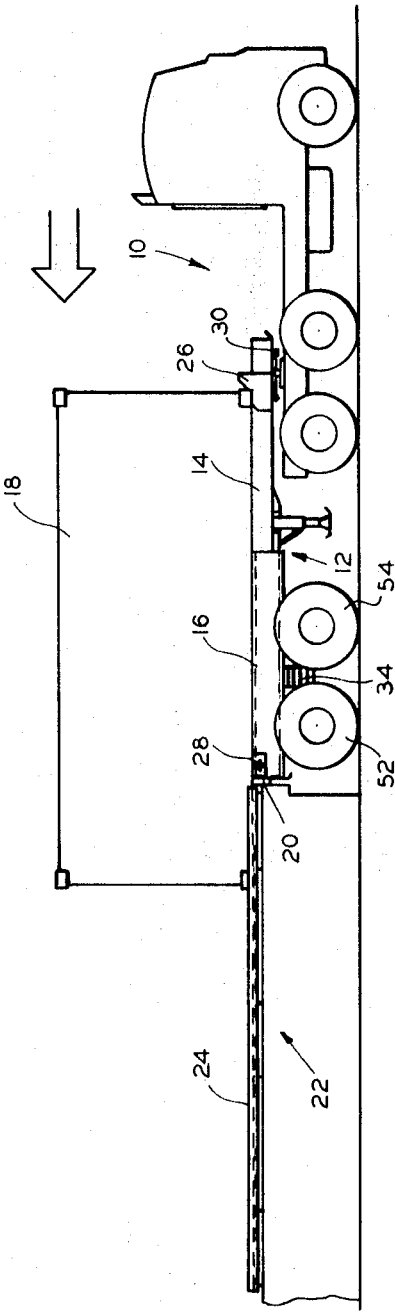

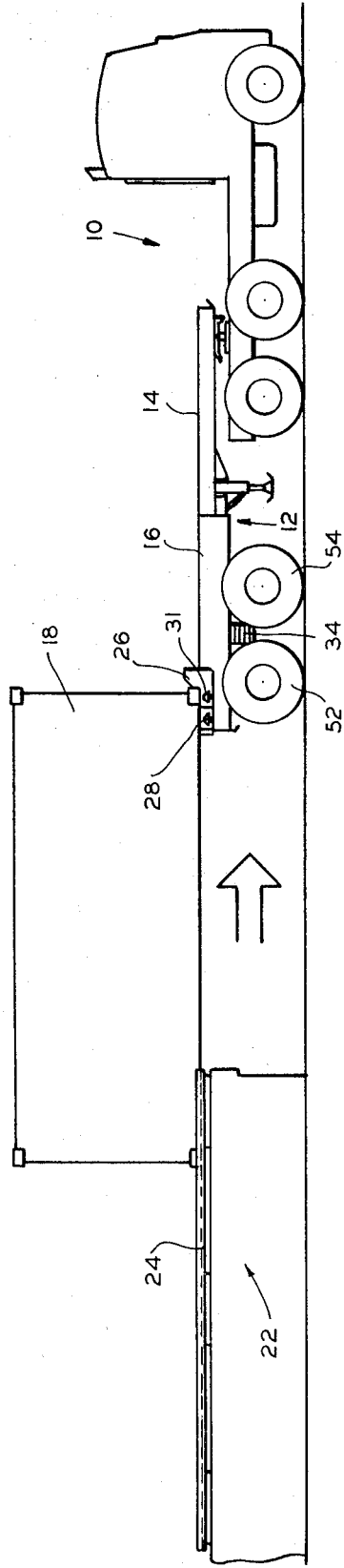
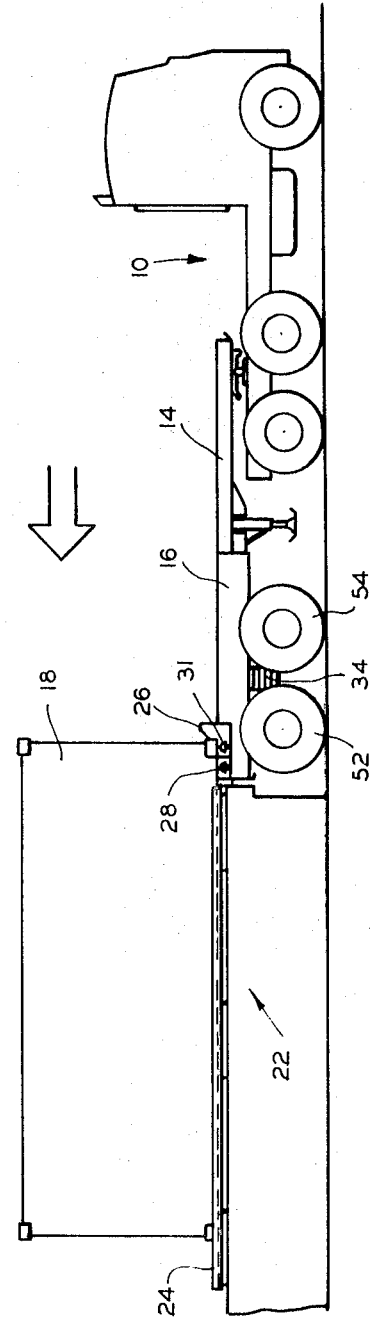

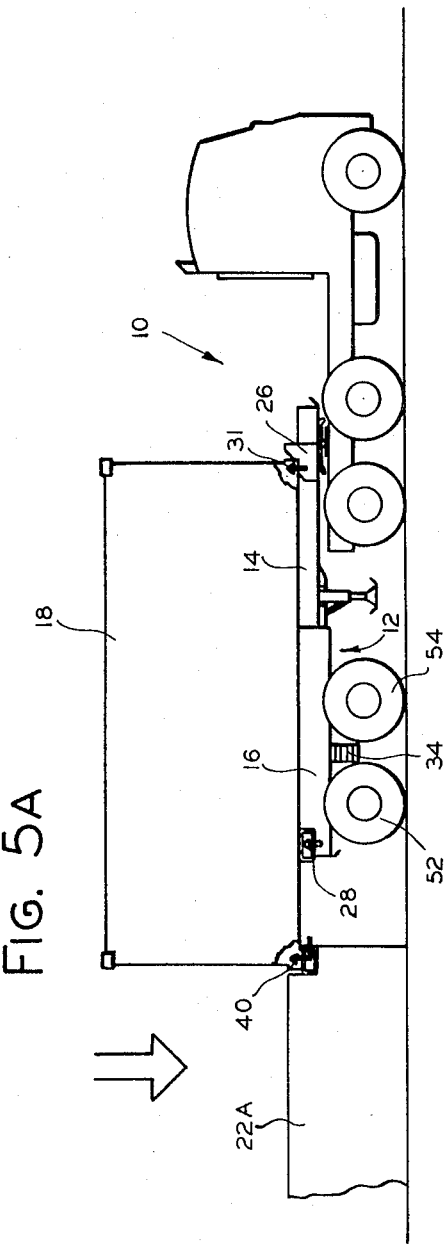
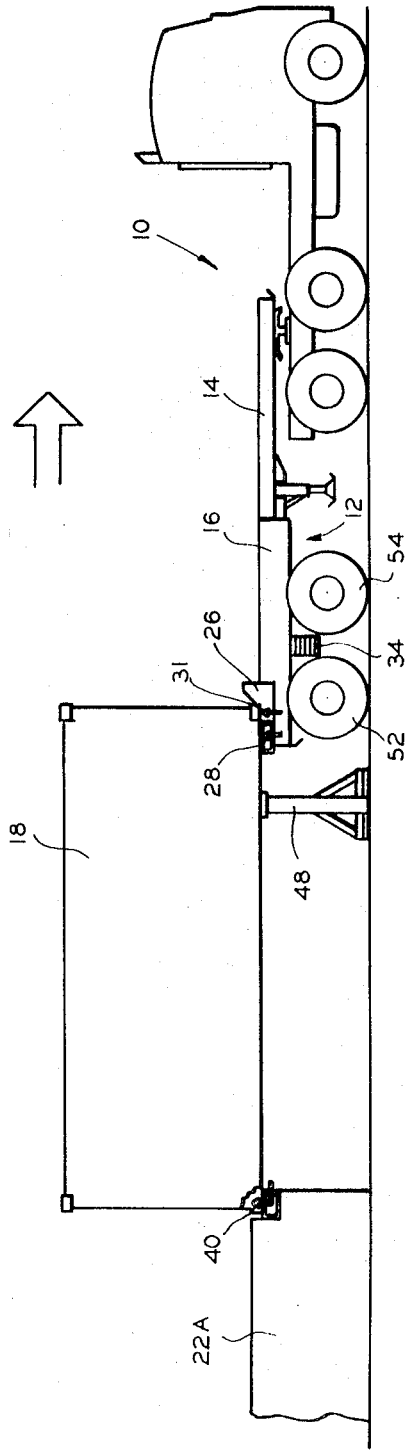

3,618,797

LOAD TRANSFER DEVICE AND METHOD

BACKGROUND OF THE INVENTION

In handling load carrying container normally carried on so-called truck trailer units, there has been various mechanisms proposed for more efficient loading and unloading these containers from the truck onto a dock or other storage facility and the further provision for loading such containers onto a truck. Many of these devices are of substantial complication requiring much mechanism for pulling the container on or off the truck. They vary in their types, but it is quite common to have devices with sliding carriages and auxiliary parts together with special cable and pulley connections for accomplishing the purpose.

SUMMARY

It is the primary object of the invention to provide a load-transferring device for the unloading of a container from a truck onto an adjacent dock, using a telescoping chassis on the truck which on reverse movement of the truck, moves the telescoping portion forward thereby leaving a rear portion of the container clear and in position to be supported on the adjacent dock or other storage surface.

It is a further object of the invention to provide a means which on subsequent forward movement of the truck carries the telescoped chassis assembly forward and under the container and wherein a following rearward movement of the truck pushes the container onto the dock in storage position.

It is another object of the invention to provide means to secure the container relative to the truck and telescoped chassis and the dock in such arrangement that the container may be again loaded on a truck from a storage dock by forward and reverse movements of the truck in substantially reversed sequence to that required for unloading the container from the truck.

It is another object, by the use of the structures disclosed including the telescoping chassis and sliding supporting surfaces, and by forward and reverse movements of the truck, to position the container with its rear edge on the front edge of the dock and its front portion resting on a removable support.

It is another object to provide a method of transfer of load container from a truck onto a dock by a series of relative sliding movements between the container and portions of the truck accomplished by a series of forward and reverse drive movements of the truck.

It is a further object to provide a method of transferring a load container from a truck onto a dock by first projecting the rear portions of the container onto the dock by reverse drive of the truck while the rear portions of the truck telescope under the container and subsequently sliding the truck rear and front portions forward under the container by forward drive of the truck and finally pushing the container further into storage position on the dock with reverse drive again. The above and other objects of the invention will appear more fully from the following more detailed description and by reference to the accompanying drawings

DRAWINGS

FIG. 1. is a side view of the trailer portion of a truck trailer assembly and includes a showing of the telescoping portions of the trailer chassis.

FIG. 3 is a side view of a truck trailer assembly in position with a container mounted thereon in position to move the container onto an adjacent dock.

FIG. 4 is a side view similar to FIG. 3 but showing the chassis telescoped with the end of the container thereby pushed into position for support on the adjacent dock.

FIG. 5 is also a side view showing the relative position of the container and truck after the truck has moved forward moving the trailer supporting surfaces under the container and leaving the container with its forward end supported on the rear end of the trailer, with the sliding bolster locked in position adjacent thereto and with the container on the edge of the dock.

FIG. 6 is a side view after the truck has been backed from the position shown in FIG. 5 so that the container has been pushed onto the dock in storage position by the reverse drive movement of the truck, the sliding bolster, locked in position, having provided an abutment for such movement.

FIGS. 3A, 4A, 5A, 6A are similar to FIGS. 3, 4, 5, and 6, but they show a modified form of the invention in which means are provided to secure the rear edge of the container to the front edge of the dock and independently support the front of the container with the tractor and trailer unit disconnected.

DESCRIPTION OF ILLUSTRATIVE STRUCTURE

Figure 2:
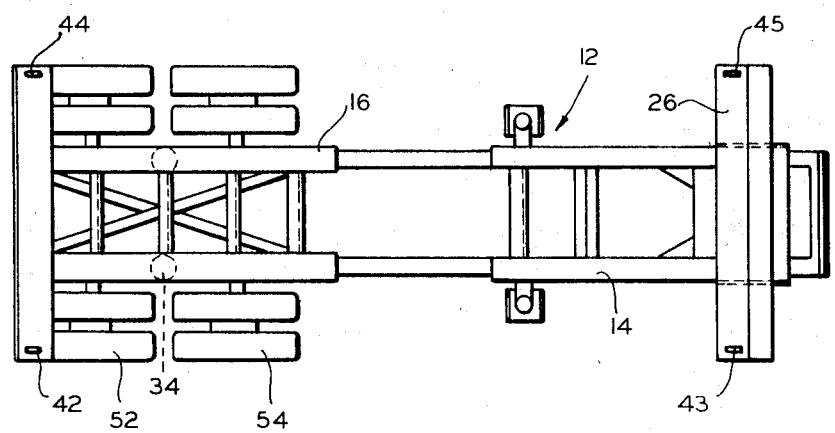
FIG. 2 is a top view of the trailer assembly shown in FIG. 1 and shows a sliding bolster in its forward position.
Figure 1:
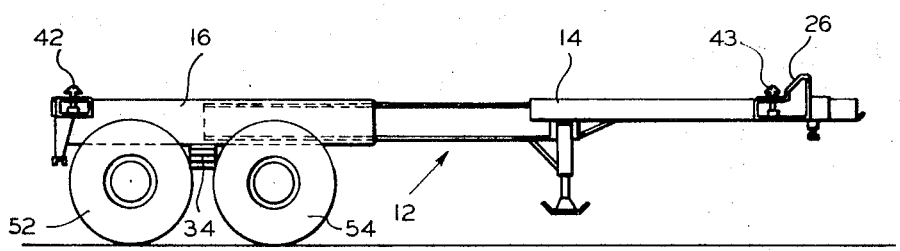
Figure 7:
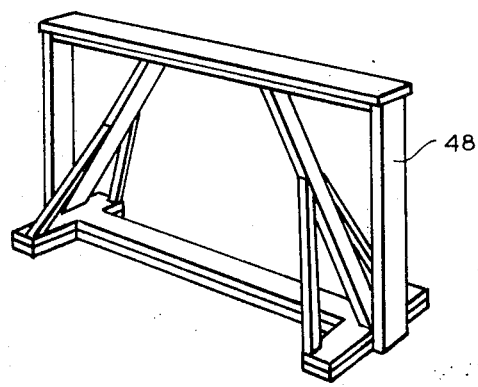
FIG. 7 is a perspective view of a removable support for the front of the container.

Referring to the drawings, FIGS. 1 and 2 show top and side views of chassis assembly 12 of the type employed in truck and trailer unit 10 with load carrying container 18 mounted on the chassis 12 as shown in FIG. 3. The chassis 12 of this disclosure is made in two parts—a forward portion 14 and a rearward portion—with the two portions so constructed that the rearward portion 16 may be moved longitudinally forward relative to the forward portion 14 (or forward portion 14 moved rearward to relative to rear portion 16) and this is accomplished in the illustrative structure by a telescoping relationship between the front and rear portions as shown in FIGS. 1 and 2. The rear portion 16 also has a rear end 20 with a flat vertical surface thereof extending in position to abut against a dock 22. Wen the truck is put in reverse drive with the end 20 abutting the dock 22, and therefore held in position relative to the ground, the result will be that the rear portion of the container 18 will be pushed rearward over the dock. Such a result can also be accomplished by setting the brakes on the trailer rear wheels which also holds the rear portion 16.

Also referring to FIGS. 1, 2 and 3 there is a sliding abutment or bolster 26 mounted to support the front end of the container 18 with means 30 to lock the bolster in position relative to the trailer 12 at a forward location (FIG. 3) or to allow it to slide rearward relative to the surface of the trailer when the lock is released. There are also provisions to slide the bolster 26 on the surface of trailer 12 to a rearward position shown in FIG. 5 where it may be locked in position by lock means 31.

A pair of angle guides 24 are preferably provided on the dock 22 and the supporting surfaces of the trailer 12, which support the container 18, and may require adjustment to bring the surface of the trailer in proper relative alignment with the surface of dock 22 and the angle guides 24 thereon. Such mechanism is provided by the air suspension device 34 which on activation will raise or lower the supporting surfaces of the trailer 12 in desired alignment relative to the dock 22.

Referring to FIGS. 3, 4, 5 and 6, the steps in the operation of the mechanism are as follows:

Referring particularly to FIGS. 3 and 4, the truck is backed toward the left as shown in FIG. 3 so that the rear end 20 of the truck, (which is also the rear end 20 of the telescoping portion 16 of the trailer), contacts dock 22. The air suspension device 34 may be actuated to bring the relative position of the lower surface of the container 18 in position so that it clears the angle guides 24. Since the front end of container 18 is abutted against the locked sliding bolster 26, it cannot move forward. Therefore, the result of such telescoping of the rear portion 16 together with its movement forward relative to the bottom surface of the container 18 is that the rear portion of the container 18 will project its rear entirely clear of the supporting portion of the trailer. This cleared projecting rear portion of the container 18 will, on continuing rearward reverse drive of the truck, project the rear portion of container 18 onto the angle brackets 24 of the dock, in an amount equal to the movement (relative to the container 18) of the rear portion 16 of the trailer, as it telescopes relative to front portion 14. The movement of container 18 onto the dock will terminate as controlled by the allowed telescoping of the front and rear portions 14 and 16. The resulting portion of the container relative to the dock is shown in FIG. 4.

Considering now the FIGS. 4 and 5, the truck is put into forward drive, as shown by the arrow in FIG. 5, and the trailer unit 12 with its front and rear portions 14 and 16 are moved forward so that the supporting surfaces of the trailer 12 slide relative to the bottom of the container 18 thus sliding the trailer forward under the container 18 to the position shown in FIG. 5, while leaving the rear portion of the container in its former position on the dock as shown in FIG. 4. The sliding bolster 26 is then slid from its position shown in FIG. 4 to its rearward position shown in FIG. 5, and locked in the position on the trailer 12 by the locking means 31 as shown in FIG. 5. The result of the movement between FIG. 4 and 5 is the sliding of the trailer forward under the container and a rearward sliding of the bolster 26 so that the front end of the container is now supported on the rear end of the trailer while the rear end of the container is supported, as before, on the angle guides 24 of the dock 22.

In addition to the apparatus disclosure above the following description of operation is particularly pertinent to a method of transfer of the load container between a truck and an adjacent dock or other storage.

With the rear portion 16 of the trailer backed into abutting position adjacent the dock 22 (FIG. 3) the reverse drive of the truck projects the rear end of the container 18 onto the dock while the rear portion 16 of the truck trailer, while held stationary relative to the dock, telescopes relatively forward in relation to the front portion 14 thus leaving the rear of container 18 clear to project onto the dock as in FIG. 4. Subsequent forward drive of the truck and trailer with the rear of the container 18 supported on the dock effects sliding of the supporting surfaces front and rear portions 14, 16 of the truck trailer 12 forward under the container 18 in position so that the container is supported with its front end on the rear of the truck trailer, and its rear end on the dock as in FIG. 5. Subsequent reverse drive of the truck, with the container secured in position on the truck, completes the sliding of the container further onto the dock into position as shown in FIG. 6, the truck movement having been used to push the container.

It is further noted that with the steps in reverse sequence the container 18 can be again loaded onto the trailer 12. That is, starting with Figure 6 the truck and trailer with the rear portion 16 of the chassis in its forward position is backed into connecting position which is the same position as shown in FIG. 6 and the locking device 31 on the bolster is secured and the truck put in forward drive. Rear telescoping portion 16 of the truck trailer is preferably secured positively in its telescoped position by suitable locking connections so that when the truck moves forward it will pull the container 18 forward with it to the position shown in Figure 5. The container is thus positioned with its rear portion on the dock and the front portion and rear portion may then be slid under the container from the Figure 5 position by putting the truck in reverse drive to move the trailer portions 14 and 16 into the position shown in FIG. 4. After this is accomplished the rear end 20 of the telescoped portion of 16 may be secured to the dock or other fixed member and the truck put into forward drive thus pulling the telescoped portion under the projecting end of the container and at the same time the rear end of the container moves off the dock from the position of FIG. 4 to the position shown in FIG. 3. In this condition the reloaded assembly is ready to be hauled away.

It is noted that in the description referring to FIGS. 3, 4, 5, and 6, particularly with reference to the mechanism which makes it possible to project the rear portion of the container 18 rearwardly over the dock on telescoping movement of the rear portion 16 of the trailer forward relative to the forward portion of the supporting surfaces of the trailer, that it is specified that the movement is accomplished by contact of the dock 22 by the rear end 20 of the trailer. This in effect causes the rear portion of the trailer to be held in position so that it does not move rearward when the truck is put in reverse drive and the result is a telescoping of the rear portion 16 relative to the front portion 14 while the container 18 moves with the truck rearwardly, to be projected over the dock as is shown by comparison of FIG. 3 with FIG. 4. It is noted that the desired result of holding the rear portion 16 of the trailer from movement may be accomplished also by setting the brakes on the wheels 52 or 54 of the trailer. It is understood that this brake on these wheels 52, 54 is independent of the brakes on the truck, that is the truck brakes for the truck vehicle itself as distinguished from the trailer wheels. The brakes on the rear wheels actuated is a condition shown in FIG. 3A and 4A, where the rear of the trailer is not shown as abutting the dock in order to hold its position, but instead the brakes of the trailer wheels 52, 54 are actuated for this holding purpose. Therefore, it is a modified form of this invention to use brake means to hold the position of the rear portion 16 in place of abutting the dock.

Figure 3A:
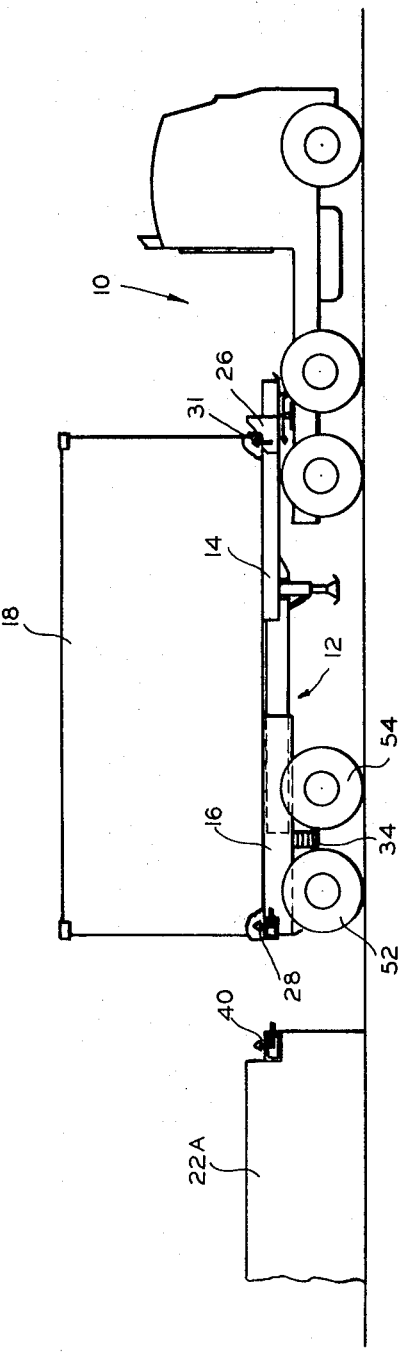
Figure 4A:
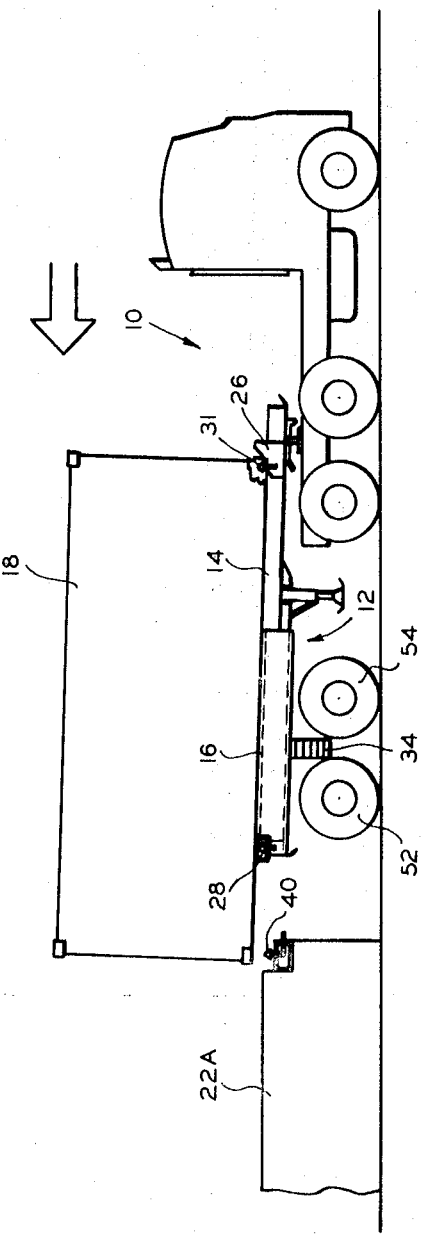

Also a modified form of the invention is shown in FIG. 3A, 4A, 5A, and 6A. Referring to FIG. 3A, it appears that it is similar in its position of the several parts to FIG. 3 in that the rear portion 16 has not been telescoped with the front portion 14 of the trailer. However, in FIG. 4A as in FIG. 4 the rear portion 16 of the trailer has been telescoped with the front portion 14 thus projecting the rear of the container 18 so that it projects over a portion of the dock 22A to a position such that a twist lock 40 secured to the dock is under the rear edge of the container. This twist lock 40 is an added element which is provided for this modification, and as appears in FIG. 5A, the container has been moved downward onto the twist lock 40 so that there is a securing of the container to the dock. The means of accomplishing the projection of the container rearwardly between FIGS. 3A and 4A is substantially equivalent to the projection effected between FIGS. 3 and 4 except that in the case 3A and 4A vertical adjustment mechanism 34 is used to a greater extent to position the container from the position shown in FIG. 3A to the position shown in FIG. 4A. Also the rear wheels 52, 54 of the trailer have had brakes applied so that from the position 3A the truck has been put in reverse drive and with the wheels 52, 54 locked by the brakes, the result of such reverse drive of the truck is to slide the container 18 over the rear portion 16 of the trailer as it telescopes with the front portion 14 thus placing the parts in a position shown in FIG. 4A with the rear of the trailer projecting, as shown, over the twist lock 40. The vertical adjustment air suspension 34 has been actuated to lift the rear portion of the trailer upward to the position shown in FIG. 4A. Then with the front and rear portions 14, 16 thus telescoped the air suspension device 34 is actuated to drop the end of the container 18 onto the twist lock 40 effecting a connection of the rear edge of the container with the twist lock 40 and the dock 22A as shown in FIG. 5A. The next step is a forward movement of the truck from the position shown in FIG. 5A to FIG. 6A. During this movement the bolster 26 slides on the trailer and both front and rear portions 14 and 16 of the trailer slide under the container 18 to the position shown in FIG. 6A and at that position the rear edge of the container 18 is secured to the dock and the front edge of the container is supported on the rear edge of the trailer. A removable support 48 is then placed under the front portion of the container 18 as shown in FIG. 6A in position to support the front end of the container on that support. With the rear of the container 18 supported on the twist lock 40 on the edge of the dock 22A as shown, then it is possible to release the truck and trailer from the front end of the container by retracting the twist locks 28 and 31 and with the truck in such condition the truck and trailer may be driven away leaving the container supported and ready to unload, load, or store as may be required when thus supported on the dock and support 48.

The modified form of the invention shown in FIGS. 3A through 6A and 7 makes use of the major portion of the structure in the first disclosed embodiment, and in effect, uses the same structure with relatively minor modification to support the container in a different position relative to the dock i.e., with its rear portion on the front edge of the dock positively secured thereto and with the front portion supported by an independent support 48 inserted before the truck and trailer unit is disconnected and driven away.

In order to secure the container in position relative to the trailer, so-called bayonet connectors 42, 43, 44 and 45 as shown in FIGS. 1 and 2 are provided one on each corner of the trailer and these connectors may be extended or retracted to either secure or release the container in a position relative to the truck trailer 12. It has been noted that in certain cases bayonet connectors are either retracted or positioned to retain the connection as may be required.

It is understood that the word "dock" as used herein is any rack or other structure provided for storage, temporary or permanent, of a load container. Also the word "truck" has been used in some cases as a broad term including the truck trailer assembly.

It will be noted that for both loading and unloading the container from the truck, the device disclosed makes possible a transfer using the forward and reverse drive on the truck to accomplish movements without elaborate mechanism.

The load transfer device has been described by reference to a specific structure, but it is expected that the structure may be modified within the scope of the following claims.

I claim:

1. In a load transfer device for moving a container from a truck trailer onto an adjacent dock;
    said truck having a trailer with forward and rearward load-carrying portions for supporting said container formed and mounted for sliding relative to the container and in telescoped relation forward and rearward relative to each other;
    mounting means allowing a sliding movement of the rearward load-carrying portion forward relative to the forward portion;
    means to hold said rearward portion of said trailer in position relative to the ground;
    whereby a rearward portion of the container, on reverse movement of the truck, projects rearward clear of the trailer and over a portion of the adjacent dock in position for support on the dock.

2. A load transfer device as in claim 1 wherein means to hold said rearward portion in position relative to the ground is a brake on the rear wheels of the trailer carried on said rearward load-carrying portion.

3. In a load transfer device as in claim 1 wherein means to hold said rearward portion of said trailer is a contact of rearward portion of the trailer with the adjacent dock.

4. A load transfer device as in claim 1 wherein further mounting means are provided positioned to allow the front and rear load-carrying portions to slide under the container on forward movement of the truck while leaving a rear portion of the container supported on the dock;
    whereby said container is supported by and between the trailer and the dock with the forward end of the container on a rearward portion of the trailer.

5. A method for transferring a load container from a truck onto an adjacent dock comprising:
    sliding the container rearward relative to the supporting surface of the truck with the truck in reverse drive, thereby projecting the container over the surface of the dock by such relative sliding movement of the container rearward relative to and between the under surface of the container and the supporting surface of the truck, with a rear portion of the truck and its supporting surface remaining stationary relative to the dock and telescoping and sliding forward relative to the remainder of the truck;
    whereby the projected portion of the container is positioned with a portion of its under surface over the surface of the dock for support thereon.

6. A method for transferring a load container from a truck onto an adjacent dock as in claim 5 comprising:
    a subsequent forward movement of the truck allowing the supporting surface portions of the truck to telescope and to slide forward under the container to a position with the front of the container adjacent the rear edge of the rear supporting surface of the truck for support thereon;
    securing the container in its supported position relative to the truck;
    a subsequent reverse drive of the truck pushing the container in movement with the truck farther onto the dock in storage position.

7. A method as in claim 6 wherein additional support is provided for the front of the container after the said subsequent forward movement of the truck;
    whereby the truck with said supporting surfaces may be driven away leaving the container supported between the edge of the dock and the additional support for the front of the container.

* * * * *